UNITED STATES PATENT OFFICE.

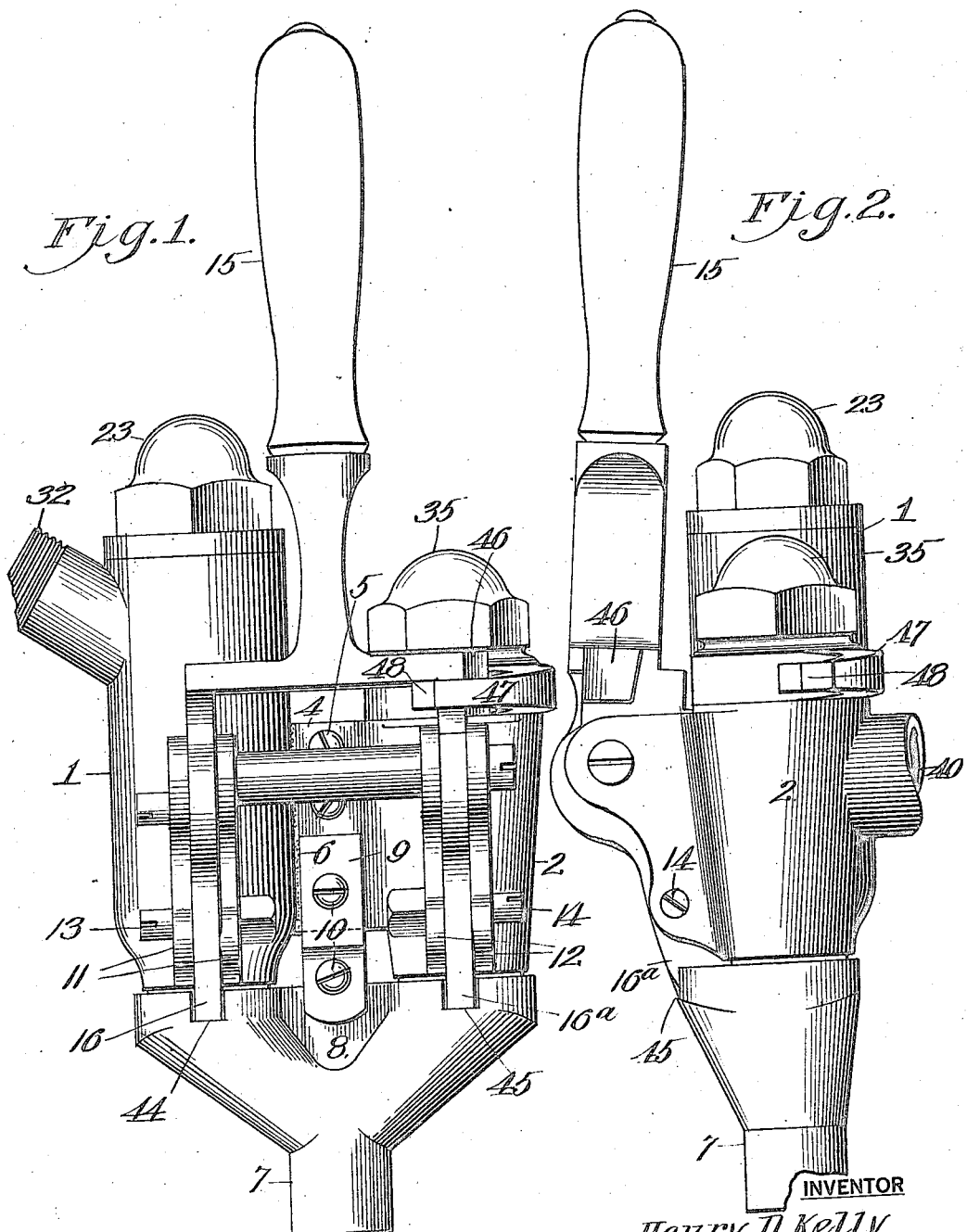

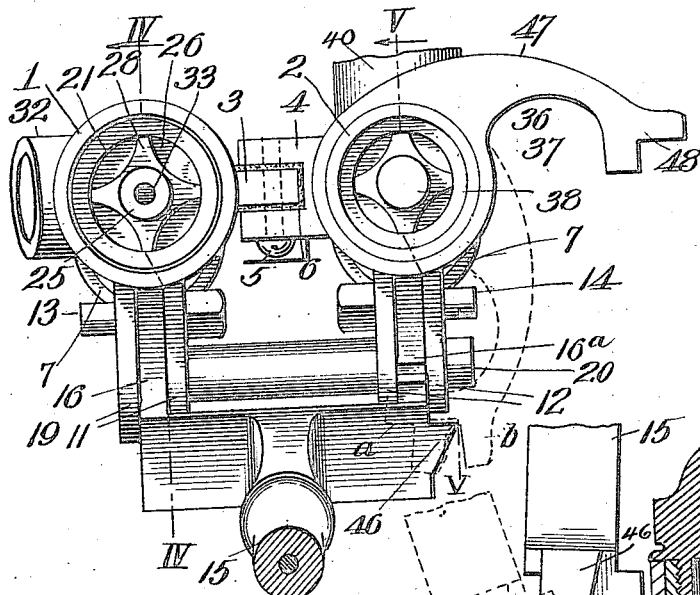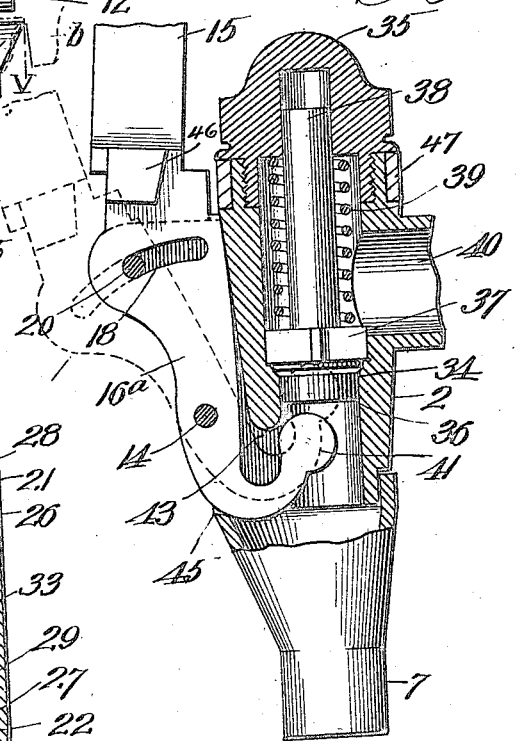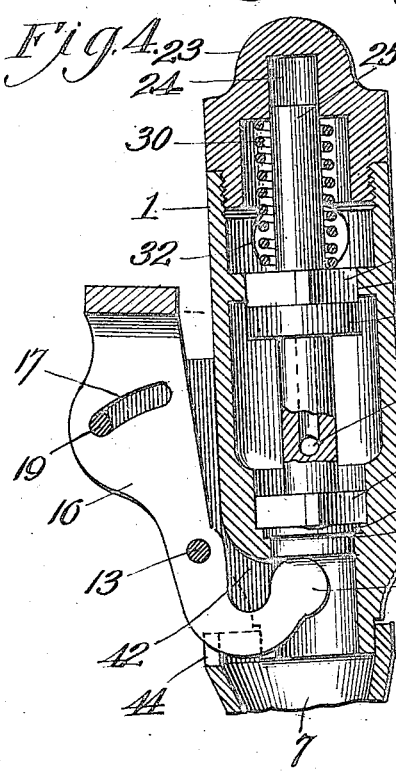

HENRY D. KELLY, OF KANSAS CITY, MISSOURI.

COMBINATION FAUCET.

1,419,386.  Specification of Letters Patent.  Patented June 13, 1922.

Application filed November 29, 1918. Serial No. 264,538.

*To all whom it may concern:*

Be it known that I, HENRY D. KELLY, a citizen of the United States, residing at Kansas City, in the county of Jackson and State of Missouri, have invented certain new and useful Improvements in Combination Faucets, of which the following is a specification.

This invention relates to combination cream and coffee measuring faucets, and more especially to such faucets for use in restaurants, hotels and the like, my object being to produce a construction whereby a single operation of a lever shall effect the discharge of a measured quantity of cream and a variable quantity of coffee into a receptacle and the reverse operation of the lever shall cut off the flow of coffee and measure off a second quantity of cream for discharge upon the next operation of the lever.

A further object is to produce means for locking the lever in either its normally closed or open position.

With these objects in view the invention consists in certain novel and useful combinations of parts as hereinafter explained; and in order that it may be fully understood reference is to be had to the accompanying drawings, in which:

Figure 1, is a front view of a combination faucet embodying the invention, with the lever locked in normal or closed position.

Figure 2, is a side view of the same with the lever in the same position, but unlocked.

Figure 3, is a top plan view of the faucet arranged as shown by Figure 2, but with certain caps omitted.

Figure 4, is a vertical section taken on the line IV—IV of Figure 3.

Figure 5, is a similar view on the line V—V of Figure 3.

In the said drawings, where like reference characters refer to corresponding parts, 1 and 2 respectively indicate the cream and coffee valve casings of the combination faucet. These casings are secured in fixed relation to each other preferably by providing one with a rib 3 for engagement with a bifurcation in a rib 4 of the other casing, and securing said ribs together by screw bolts 5 or the like. It may also be desirable to guard against the flow of heat from the coffee casing 2 to the cream casing 1, and to avoid this difficulty insulation 6 is fixed between the interlocked ribs 3 and 4.

The lower ends of the casings are diametrically reduced and fit in the upper ends of a Y-shaped spout 7 for discharge into a cup or other receptacle, and said spout has a central rib 8 to abut against the lower end of ribs 3 and 4, and is secured in place by a short metal strap 9 fastened by screw bolts 10 to said rib 9 and the bifurcated rib 4. The casings are respectively provided with pairs of vertical forwardly projecting ribs 11 and 12, and extending through said pairs of ribs respectively are alined pivot bolts 13 and 14. A hand lever 15 has branched arms 16 and 16ª fitting between the ribs of the parallel sets of the casings, and pivoted upon the pivot bolts 13 and 14, and said arms 16 and 16ª are provided with slots 17 and 18 respectively, extending concentrically of pivot bolts 13 and 14 and engaged by stop pins 19 and 20 respectively extending across the space between ears 11 and 12, it being noticed by reference to Figures 4 and 5 that while the arms 16 and 16ª move together as one, the one performs its function of effecting the discharge of cream and ends such discharge about the time or just prior to the performance of its function by the other arm, that is the arm which effects the discharge of the coffee.

The casing 1 is cylindrical and provided with an upper valve opening 21 and a lower valve opening 22 and is closed at its upper end by a removable cap 23 provided with a guide socket 24 for a valve stem 25 extending through opening 21 and provided with a valve 26 normally below and not obstructing said opening and with a valve 27 normally engaging and closing the valve opening 22, valve 26 having centralizing or guide ribs 28 and valve 27, centralizing or guide ribs 29 to engage the casing and insure vertical reciprocatory action of the valve stem, which is normally held depressed by a coiled spring 30 bearing at its upper end against the cap 23 and at its lower end upon the guide ribs 28 of the valve stem. The pressure of said spring, and of a similar spring hereinafter mentioned, holds the lower end of the valve down upon the upturned end 31 of arm 16 of the lever, it being noticed in this connection that the casing 1 has a branch arm 32 for connection by piping or otherwise with a cream supplying vessel, and that due to this connection the casing 1 stands normally charged with cream, and that the chamber below valve opening 21 can stand fully charged because air will vent up through the valve stem through the opening 33, and escape thence, if necessary, downwardly around the said stem and up through the arm 32.

Referring now to the coffee valve casing 2, it will be seen that the same is provided with a single valve opening 34 and that its upper end is closed by a cap 35 similar to cap 23. The valve opening 34 is controlled by a valve 36 provided with centralizing or guide ribs 37 and with a stem 38 to fit slidingly in the central socket of the cap 35, a spring 39 fitting around said stem and bearing at its opposite ends against the said cap and said guide ribs 37, for the purpose of holding the valve 36 yieldingly seated. The casing 2 is provided with a tubular supply stem 40 for suitable connection with a coffee urn or other liquid dispensing vessel, and the lower end of the valve is preferably spaced slightly above the upturned end 41 of the arm 16ª of the operating lever, it being noticed with respect to both casings 1 and 2, that each is bifurcated at its lower end as at 42 and 43 respectively for the play or accommodation of the respective arms of said lever, and that the arms of the Y-shaped spout preferably project forward beyond the said bifurcations 42 and 43 so as to avoid any chance of the liquids spraying forwardly through said bifurcations and onto the operator instead of through the spout. As the parts are illustrated the arms of the spout are shown as bifurcated at 44 and 45, for the accommodation respectively of the lever arms 16 and 16ª.

The lever is provided at the outer side of arm 16ª with a lug 46, the same standing in the horizontal plane of the upper end of casing 2, which end is diametrically reduced and forms a journal or pivot for a locking arm 47. This arm at its free end is notched at 48, and when the arm is swung to the position shown by dotted lines a, Figure 3, the free end stands in front of arms 16ª, of the lever and prevents the valve opening operation of the lever. After the lever has been operated it can be locked with the valves in open position, by disposing the locking arm 47 in the dotted position b, Figure 3, that is with the inner part of the notched end engaging the inner face of the lug 46. If desired, the locking arm can be thrown to the inoperative position shown by full lines, Figure 3, in which position it is entirely out of the way of the lever.

Assuming that the lever is in the position indicated in Figures 1 and 2, it will be apparent that the casing 1 is standing charged with cream, and that the instant the lever begins to move forward under the pull applied by the operator, the end 31 of lever arm 16, imparts upward movement to valve 27 and valve 26, and that instantly the last named valve closes valve opening 21 so that the faucet shall measure off a predetermined quantity of cream, namely that quantity standing below the level of opening 21. The continued operation of the lever next effects the unseating of valve 27 to permit the measured quantity of cream to be discharged through the spout into a cup or other vessel, and causes the arm 16ª to engage and force valve 36 upward to permit coffee or other liquid supplied through stem 40, to pass down through casing 2 and the spout 7 into a cup or other vessel held under said spout for the reception thereof and of the cream, the release of the lever being instantly followed by its return to normal position and by the reseating of valves 27 and 36 and the reopening of valve 26 under the reaction of the springs respectively controlling said valves.

If it is desired to drain or withdraw a large quantity of coffee from the coffee urn or the like, the operator can lock the lever with valve 36 in its opened position, by swinging the locking arm 47 to the position indicated by dotted lines b. To guard against accidental valve-opening operation of the lever, said locking arm 47 can be adjusted to the position indicated by dotted line a.

From the above description it will be apparent that I have produced a combination cream and coffee faucet embodying the features of advantage set forth as desirable, and while I have illustrated and described the preferred construction, it will be apparent that it is susceptible of modification in minor particulars without departing from the principle of construction involved or from the spirit and scope of the appended claims.

I claim:

1. The combination of a pair of faucets having supply ports, yieldingly closed valves between the respective supply ports and discharge ends of the faucets, a lever for opening the valves, means for closing communication between one only of the valves and the supply port therefor before the opening of said valve is effected, and means for locking both valves open and the communication-closing means in closed position.

2. The combination of a pair of faucets having supply ports, yieldingly closed valves between the respective supply ports and discharge ends of the faucets, a lever for opening the valves, means for closing communication between one only of the valves and the supply port therefor before the opening of said valve is effected, and means for locking both valves open and the communication-closing means in closed position or for locking said lever in position with said valves closed and said communication-closing means in open position.

3. The combination of a pair of faucets having supply ports, valves between the respective supply ports and discharge ends of the faucets, a lever provided with branch arms projecting into the lower ends of the faucets and respectively underlying said faucets, means for limiting the opening movement of the lever, means for closing communication between one only of the valves and the supply port therefor before the opening of said valve is effected, springs for returning said valves and said communication-closing means to their original positions and for cooperating through said valves in returning the lever to its initial position, and means for locking both valves open and the communication-closing means in closed position or for locking said lever in position with said valves closed and said communication-closing means in open position.

4. The combination of a pair of faucets having supply ports and discharge openings, a yieldingly closed valve in each of said faucets between the supply port and discharge opening thereof, a lever for simultaneously opening said valves, means in one of said faucets for actuation by said lever for closing the supply port of such faucet before the valve thereof is opened, and a swing arm pivoted for movement in a plane at right angles to that of said lever and adapted to engage the latter and lock it in the position in which the valves are closed.

5. The combination of a pair of faucets having supply ports and discharge openings, a yieldingly closed valve in each of said faucets between the supply port and discharge opening thereof, a lever for simultaneously opening said valve, means in one of said faucets for actuation by said lever for closing the supply port of such faucet before the valve thereof is opened; said lever having a lug, and a swing arm mounted for horizontal movement and adapted for engaging said lever to hold the same in the position in which the valves are closed and provided with a notched end for engaging said lug to hold said valves opened.

In testimony whereof I affix my signature.

HENRY D. KELLY.